Patented Apr. 11, 1944

2,346,531

UNITED STATES PATENT OFFICE 2,346,531

AZOLE DISAZO DYE COMPOUNDS AND THEIR MANUFACTURE

Charles F. H. Allen and Gordon F. Frame, Rochester, N. Y., assignors to Eastman Kodak Company, Rochester, N. Y., a corporation of New Jersey No Drawing. Application June 1, 1942, Serial No. 445,384

15 Claims. (Cl. 260—157)

This invention relates to new disazo dye compounds and to a process for their preparation.

We have found that new disazo dye compounds can be prepared by coupling a diazotized aminobenzotriazole, a diazotized 3-amino-1,2,4-triazole or a diazotized 5-aminotetrazole with 1-amino-8-naphthol-3,6-disulfonic acid, 2-amino-5-naphthol-7-sulfonic acid, 1-amino-8-naphthol-4,6-disulfonic acid or 1-amino-8-naphthol-4-sulfonic acid in an acid medium and then coupling the monoazo dye compound thus obtained with a diazotized heterocyclic amine compound in an alkaline medium. The disazo dye compounds thus obtained are water-soluble.

It is an object of our invention to prepare new disazo dye compounds. Another object is to provide a satisfactory process for the preparation of the new disazo dye compounds of our invention. A further object is to provide new water-soluble disazo dye compounds which can be used to color wool.

Insofar as the dyeing of textile materials is concerned, the disazo dye compounds of our invention appear to be principally of utility for the dyeing of wool although they also possess some utility for the dyeing of cotton. Depending on the particular components employed, orange red, blue, blue-black and black dyeings, for example, can be obtained. In addition to being textile dyes, the disazo dye compounds of our invention also possess some application as dyes for color photography, particularly as the presence of a heterocyclic nucleus permits the formation of complexes with a metal like silver.

The disazo dye compounds of our invention can be represented by the formula:

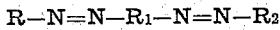

wherein R—N=N— represents the residue of a diazotized member selected from the group consisting of an aminobenzotriazole, a 3-amino-1,2,4-triazole and a 5-aminotetrazole, $R_1$ represents the residue of a coupling component selected from the group consisting of 1-amino-8-naphthol-3,6-disulfonic acid, 2-amino-5-naphthol-7-sulfonic acid, 1-amino-8-naphthol-4,6-disulfonic acid and 1-amino-8-naphthol-4-sulfonic acid and —N=N—$R_2$ stands for the residue of a diazotized aminoheterocyclic compound.

We would here note that in our investigation of disazo dye compounds containing two heterocyclic nuclei, we have discovered that not all monoazo dyes prepared by coupling a diazotized heterocyclic amine in an acid medium with the naphthol sulfonic acid coupling components mentioned herein are capable of coupling in an alkaline medium with a diazotized heterocyclic-amine to form a disazo dye compound. Thus, the monoazo dye compounds obtained by coupling diazotized 6-aminoindazole or X-amino-2-mercaptobenzoxazole (prepared by mononitrating 2-mercaptobenzoxazole and reducing the nitrated compound obtained to its amino form. The position of the amino group is unknown) in an acid medium with either 1-amino-8-naphthol-3,6-disulfonic acid or 2-amino-5-naphthol-7-sulfonic acid do not couple to form disazo dyes with a diazotized heterocyclic amine in an alkaline solution. While we have not been able to investigate all of the possible disazo dye compounds containing two heterocyclic nuclei, the results of our investigation lead us to believe that if certain particular diazotized heterocyclic amines are coupled in an acid medium with the coupling components named herein, the monoazo dye compounds resulting will couple in an alkaline medium with diazotized heterocyclic amines in all or substantially all cases.

The following examples illustrate the preparation of the azo compounds of our invention. Parts are expressed by weight.

EXAMPLE 1

(a) *Diazotization of 3-amino-1,2,4-triazole and its coupling with J acid in acid solution*

0.76 part of 3-amino-1,2,4-triazole are diazotized by dissolving in 20 parts of water containing 0.5 parts of sodium carbonate and 5.4 parts of a 12% solution of sodium nitrite, cooling the solution to 0° C. and then adding to a solution of 8 parts of concentrated hydrochloric acid (sp. gr. 1.19) in 20 parts of water. Sufficient ice is added from time to time during the diazotization reaction to maintain the temperature of the reaction mixture at 0° C. Upon completion of the diazotization reaction, the reaction mixture is added with stirring to a solution of 2.15 parts of 2-amino-5-naphthol-7-sulfonic acid and 0.5 part of sodium carbonate in 50 parts of water at 0° C. Preferably the coupling solution just described should have a pH of 1.5-2. The reaction mixture is allowed to warm up slowly to room temperature and the coupling reaction which takes place is continued for 4 hours. Sodium carbonate is then added to the reaction mixture until a pH of 6.5 is reached and then 5 parts more of sodium carbonate are added. The reaction mixture resulting is now ready for coupling in an alkaline medium.

(b) *Diazotization of 6-aminoindazole and its coupling with the monoazo dye formed above in alkaline medium*

1.2 parts of 6-aminoindazole dissolved in 30 parts of water and 4 parts of concentrated hydrochloric acid (sp. gr. 1.19) are diazotized at 0° C. by adding 5.4 parts of a 12% water solution of sodium nitrite. Throughout the diazotization reaction the temperature is kept at about 0° C. by the addition of ice. Upon completion of the diazotization reaction, the reaction mixture is added to the solution of the monoazo dye prepared as described above and the temperature of the reaction mixture is kept at 0° to 10° C. by external cooling. During the coupling reaction which takes place the pH of the reaction mixture should be approximately 8.5 to 9.5. The coupling reaction is continued for 2 hours at the end of which time a scarlet dye has precipitated. The dye compound formed is recovered by filtration and dried.

The dye compound obtained has the formula:

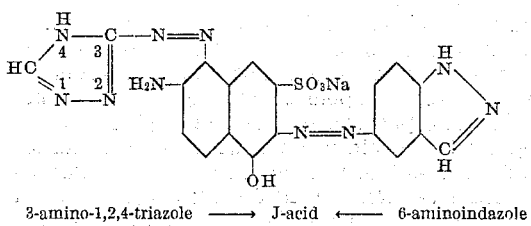

3-amino-1,2,4-triazole ⟶ J-acid ⟵ 6-aminoindazole and dissolves in water with a scarlet color. Similarly, it dyes wool and cotton a scarlet color. When the dye on the cotton is diazotized and coupled with β-naphthol in an alkaline medium, the shade becomes more bluish and when coupled with m-phenylenediamine in an acetic acid solution the shade becomes brownish.

EXAMPLE 2 x-Amino-2-mercaptobenzoxazole is diazotized by dissolving 1.5 parts in 50 parts of water and 4 parts of concentrated hydrochloric acid (sp. gr. 1.19) and adding 5.4 parts of a 12% aqueous sodium nitrite solution while maintaining the reaction of mixture at a temperature of 0° C. Upon completion of the diazotization reaction, the solution resulting is added to the alkaline solution of the monoazo dye prepared as described in Example 1 and the coupling reaction which takes place is continued at about 10° C. for two hours. The pH of the coupling solution should be about 8.5 to 9.5. Upon completion of the coupling reaction, the dye compound formed separates from the solution and is collected on a filter and dried.

The dye compound obtained has the formula:

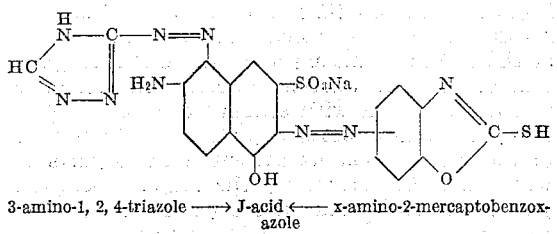

3-amino-1, 2, 4-triazole ⟶ J-acid ⟵ x-amino-2-mercaptobenzoxazole and dissolves in water with a dull red color. It dyes wool an old rose shade from an acid bath and cotton a red shade from a neutral bath. When the dye on the cotton fiber is diazotized and coupled in an alkaline solution with β-naphthol, the shade turns slightly bluer and when coupled with m-phenylenediamine in an acetic acid solution the shade becomes reddish-brown.

EXAMPLE 3

(a) *Diazotization of 5-aminotetrazole and its coupling with H acid in acid solution*

0.64 part of 5-aminotetrazole are dissolved in 50 parts of water containing 0.3 part of sodium carbonate. The solution is cooled to 0° C. and then 4.4 parts of a 12% aqueous sodium nitrite solution are added and the reaction mixture resulting is added to a solution of 7 parts of concentrated hydrochloric acid (sp. gr. 1.19) in 10 parts of water. The reaction mixture is maintained at 0° C. during the diazotization reaction which takes place. Upon completion of the diazotization reaction, the reaction mixture is added to a solution of 2.57 parts of 1-amino-8-naphthol-3,6-disulfonic acid in 50 parts of water at 5° C. The coupling reaction which takes place is continued for 5 hours after which the solution is slowly permitted to come to room temperature. The pH of the coupling solution is preferably in the range 1.5–2.5. Upon completion of the coupling reaction sodium carbonate is added to the reaction medium until the pH is brought to 6.7 and then 4 parts more of sodium carbonate are added. The reaction medium is now ready for coupling in an alkaline solution.

(b) *Coupling of 6-aminoindazole with the monoazo dye prepared above in alkaline solution*

1 part of 6-aminoindazole is diazotized as described in Example 1. The diazonium solution obtained is added to the alkaline monoazo dye solution prepared as described above at a temperature of about 5° C. with stirring. The pH of the coupling solution is about 8.5 to 9.5. While cooling externally the reaction mixture is stirred for 2 hours at about 10° C. following which the dye compound formed is precipitated by the addition of sodium chloride. The precipitated dye compound is recovered by filtration and dried. The dye compound obtained has the formula:

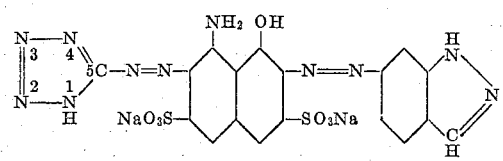

5-aminotetrazole ⟶ H-acid ⟵ 6-aminoindazole and dissolves in water with a dull blue color. It dyes wool a blue-black color from an acid solution.

EXAMPLE 4

1.64 parts of 6-amino-2-mercaptobenzothiazole hydrochloride are dissolved in 25 parts of water containing 2 parts of concentrated hydrochloric acid (sp. gr. 1.19). The resulting solution is cooled to a temperature of 0°–5° C. and diazotized at this temperature by the addition of 4.4 parts of a 12% aqueous solution of sodium nitrite. Upon completion of the diazotization reaction which takes place, the solution is added at a temperature of 5–10° C. with stirring to the alkaline solution of the monoazo dye prepared in Example 3. During the coupling reaction which takes place the pH of the coupling solution preferably should be in the range of 8.5–9.5. The coupling reaction is continued for 2 hours following which the dye compound formed is precipitated by the addition of sodium chloride. The precipitated dye compound is recovered by filtration and dried. The dye compound obtained has the formula:

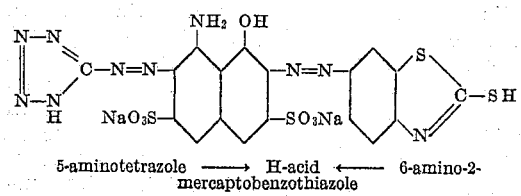

5-aminotetrazole ⟶ H-acid ⟵ 6-amino-2-mercaptobenzthiazole and dissolves in water with a dull blue color. It dyes wool a blue-black color from an acid bath.

EXAMPLE 5

0.64 part of 5-aminotetrazole are diazotized as described in Example 3 and the diazonium solution obtained is added to the alkaline solution of the monoazo dye prepared in Example 3. The pH of the combined solutions should be approximately 8.5 to 9.5. The coupling reaction which takes place is continued for 2 hours at a temperature of 5–10° C. Following completion of the coupling reaction a salt such as sodium chloride or sodium sulfate is added to precipitate the dye compound formed and the precipitated dye compound is recovered by filtration and dried. The dye compound obtained has the formula:

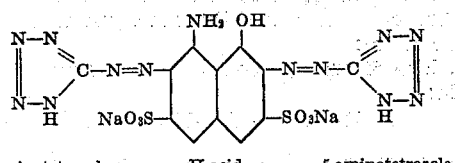

5-aminotetrazole ⟶ H-acid ⟵ 5-aminotetrazole and dissolves in water with a deep red color. It dyes wool a reddish-black shade from an acid solution.

EXAMPLE 6

(a) *Diazotization of 5-aminobenzotriazole and its coupling with H acid in acid solution*

2 parts of 5-aminobenzotriazole are dissolved in 100 parts of water and 18 parts of concentrated sulfuric acid (sp. gr. 1.83). The resulting solution is then cooled to a temperature of 5–10° C. and 1.06 parts of sodium nitrite are added at this temperature with stirring. After 15 minutes the diazonium solution resulting is added with stirring to a solution in 5.09 parts of 1-amino-8-naphthol-3,6-disulfonic acid in 100 parts of water at 0° C. The coupling reaction which takes place is allowed to continue overnight. Sodium carbonate is then added to the reaction mixture until the neutral point is reached and then 10 parts more of the sodium carbonate are added. The solution is now a magenta color.

(b) *Coupling of diazotized 5-aminobenzotriazole with the monoazo dye prepared above*

2 parts of 5-aminobenzotriazole are diazotized as described above and the diazonium solution obtained is added to the solution of the monoazo dye prepared above. The coupling reaction which takes place is continued for 1½ hours while maintaining the reaction mixture in a cooled condition. During this coupling reaction the reaction mixture turns purple in color. The dye compound formed is precipitated by the addition of sodium sulfate and is recovered by filtration and dried. Three parts of the dye having in its free acid form the formula:

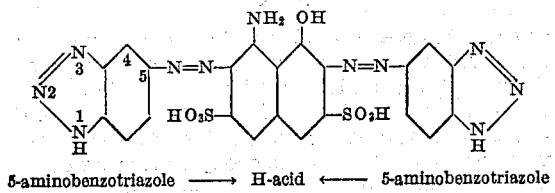

5-aminobenzotriazole ⟶ H-acid ⟵ 5-aminobenzotriazole are obtained. This dye dissolves easily in water with a purple color and dyes wool a dark blue color from an acid bath.

EXAMPLE 7

0.76 part of 3-amino-1,2,4-triazole are diazotized as described in Example 1 and the diazonium compound obtained is added to the alkaline solution of the monoazo dye prepared in Example 1. Throughout the coupling reaction which takes place, the temperature of the reaction mixture is kept at 0°–10° C. by external cooling. Also during the coupling reaction the pH of the reaction mixture should be approximately 8.5 to 9.5. After about 1½ hours the disazo dye formed by the coupling reaction precipitates from the reaction mixture and is recovered by filtration and dried.

The dye compound obtained has the formula:

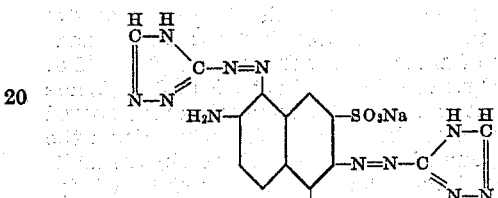

3-amino-1,2,4-triazole ⟶ J-acid ⟵ 3-amino-1,2,4-triazole and dissolves in water with a reddish-yellow color. It dyes wool a golden orange color from an acid bath and cotton yellowish-red from a neutral bath. When the dye on the cotton fiber is further diazotized and coupled with β-naphthol, the shade turns slightly redder and when coupled with m-phenylenediamine the color becomes a reddish-brown.

EXAMPLE 8

2 parts of 5-aminobenzotriazole are diazotized as described in Example 6 and the diazonium solution resulting is added with stirring to a solution of 5.09 parts of 1-amino-8-naphthol-4,6-disulfonic acid in 100 parts of water at 0° C. The coupling reaction which takes place is allowed to continue to completion after which sodium carbonate is added to the reaction mixture until the neutral point is reached. Following this, 10 parts more of sodium carbonate are added and the reaction mixture resulting is ready for coupling in an alkaline medium.

2 parts of 5-aminobenzotriazole are diazotized and the diazonium solution obtained is added to the solution of the monoazo dye prepared above. The coupling reaction which takes place is continued for about 1½ hours while maintaining the reaction mixture in a cooled condition. The dye compound formed is precipitated by the addition of sodium sulfate and is recovered by filtration and dried.

The dye compound obtained has in its free acid form the formula:

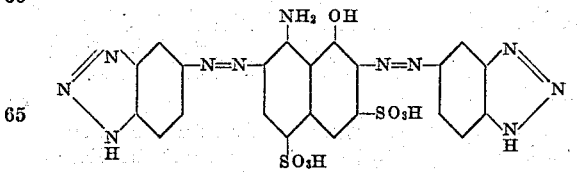

5-aminobenzotriazole ⟶ K-acid ⟵ 5-aminobenzotriazole

This dye dissolves readily in water and dyes wool a blue color from an acid bath.

EXAMPLE 9

0.64 part of 5-aminotetrazole are diazotized as described in Example 3 and the diazonium mixture obtained is added with stirring to a solution of 1.9 parts of 1-amino-8-naphthol-4-sulfonic acid and 0.5 part of sodium carbonate in 50 parts of water at 5° C. The coupling reaction which takes place is continued for about 5 hours after which the solution is slowly permitted to come to room temperature. The pH of the coupling solution is preferably in the range of 1.5–2.5. Upon completion of the coupling reaction, sodium carbonate is added to the reaction mixture until the pH is brought to 6.7 and then 4 parts more of sodium carbonate are added. The reaction mixture is now ready for coupling in an alkaline solution.

One part of 6-aminoindazole is diazotized as described in Example 1. The diazonium solution obtained is added to the alkaline monoazo dye solution prepared as described above at a temperature of about 5° C. with stirring. The pH of the coupling solution is about 8.5 to 9.5. While cooling externally, the reaction mixture is stirred for 2 hours at about 10° C. following which the dye compound formed is precipitated by the addition of sodium chloride. The precipitated dye compound is recovered by filtration and dried. The dye compound obtained has in its free acid form the formula:

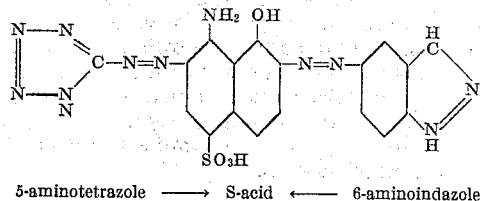

5-aminotetrazole ⟶ S-acid ⟵ 6-aminoindazole and dissolves in water with a bluish color. It dyes wool a blue-black color from an acid solution.

As a further illustration of our invention, the disazo dye compounds indicated hereinafter may be prepared in accordance with the procedure indicated in Examples 1 to 9, inclusive. In preparing the dyes indicated, it will be understood that the amine in the left hand column is diazotized and coupled in an acid medium with the coupling component set forth in the center column. The amine compound in the right hand column is diazotized and coupled in an alkaline medium with the monoazo dye resulting from the operation just described.

| Amine | Coupling component | Amine |
|---|---|---|
| 3-amino-1,2,4-triazole | H-acid | 5-aminotetrazole. |
| Do | K-acid | 6-aminoindazole. |
| Do | S-acid | 6-amino-2-mercaptobenzothiazole. |
| Do | H-acid | 7-aminoindazole. |
| Do | do | 4-chloro-5-aminoindazole. |
| 4-aminobenzotriazole | do | 3-amino-1,2,4-triazole. |
| Do | J-acid | 5-aminotetrazole. |
| 5-aminobenzotriazole | do | 3-amino-1,2,4-triazole. |
| Do | S-acid | 5-aminotetrazole. |
| 5-aminotetrazole | J-acid | 6-aminoindazole. |
| Do | K-acid | 5-aminobenzotriazole. |
| Do | H-acid | 3-amino-1,2,4-triazole. |
| Do | J-acid | 4-aminobenzotriazole. |

Additional heterocyclic amine compounds that can be employed in the preparation of the disazo dye compounds of the invention in accordance with the teachings of the invention include 5,7-dinitro-6-aminoindazole, 7-chloro-6-aminoindazole, 6-nitro-4-aminobenzotriazole, 4-chloro-5-aminobenzotriazole and 5-methyl-7-aminobenzotriazole. It will be understood that the examples given are intended to be illustrative and not limitative of the invention. Thus, within the teachings of the invention, any of the heterocyclic-amines indicated herein can be diazotized and coupled in an alkaline medium with the monoazo dyes described herein to give disazo dye compounds of the invention. Similarly, additional monoazo dyes of the type disclosed can be prepared and coupled in an alkaline medium with a diazotized heterocyclicamine to yield disazo dye compounds of the invention.

The exact manner in which the disazo dye compounds are applied to wool or cotton forms no part of our invention. They can be applied to these textile materials by methods well known to the art for coloring these materials. If desired, they may be applied to wool by the procedure described on page 402 of "The Synthetic Dyestuffs and Intermediate Products" by Cain & Thorpe (1934 edition) or to cotton by the procedure described on page 404 of the work just mentioned.

We claim:

1. The disazo dye compounds having the formula:

wherein R—N=N— represents the residue of a diazotized member selected from the group consisting of an aminobenzotriazole, a 3-amino-1,2,4-triazole and a 5-aminotetrazole, $R_1$ represents the residue of a coupling component selected from the group consisting of 1-amino-8-naphthol-3,6-disulfonic acid, 2-amino-5-naphthol-7-sulfonic acid, 1-amino-8-naphthol-4,6-disulfonic acid and 1-amino-8-naphthol-4-sulfonic acid and —N=N—$R_2$ stands for the residue of a diazotized aminoheterocyclic compound containing five members in the heterocyclic ring, at least one of which members is nitrogen.

2. The disazo dye compounds having the formula:

wherein R—N=N— represents the residue of a diazotized member selected from the group consisting of an aminobenzotriazole, a 3-amino-1,2,4-triazole and a 5-aminotetrazole, $R_1$ represents the residue of a coupling component selected from the group consisting of 1-amino-8-naphthol-3,6-disulfonic acid, 2-amino-5-naphthol-7-sulfonic acid, 1-amino-8-naphthol-4,6-disulfonic acid and 1-amino-8-naphthol-4-sulfonic acid and —N=N—$R_2$ stands for the residue of a diazotized member selected from the group consisting of an amino-benzotriazole, a 3-amino-1,2,4-triazole, a 5-aminotetrazole, an aminoindazole, an amino-2-mercaptobenzoxazole and an amino-2-mercaptobenzothiazole.

3. The disazo dye compounds which in their free acid form have the formula:

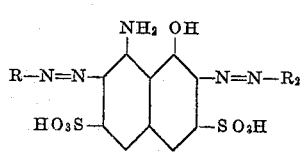

wherein R—N=N— represents the residue of a diazotized member selected from the group consisting of an aminobenzotriazole, a 3-amino-1,2,4-triazole and a 5-aminotetrazole and —N=N—$R_2$ stands for the residue of a diazotized member selected from the group consisting of an aminobenzotriazole, a 3-amino-1,2,4-triazole, a 5-aminotetrazole, an aminoindazole, an amino-2-mercaptobenzoxazole and an amino-2-mercaptobenzothiazole.

4. The disazo dye compounds which in their free acid form have the formula:

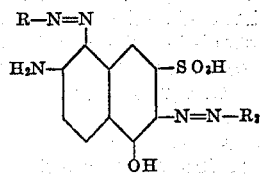

wherein R—N=N— represents the residue of a diazotized member selected from the group consisting of an aminobenzotriazole, a 3-amino-1,2,4-triazole and a 5-aminotetrazole and —N=N—R$_2$ stands for the residue of a diazotized member selected from the group consisting of an aminobenzotriazole, a 3-amino-1,2,4-triazole, a 5-aminotetrazole, an aminoindazole, an amino-2-mercaptobenzoxazole and an an amino-2-mercaptobenzothiazole.

5. The disazo dye compounds having the formula:

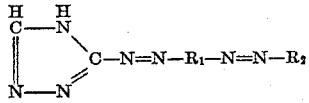

wherein R$_1$ represents the residue of a coupling component selected from the group consisting of 1-amino-8-naphthol-3,6-disulfonic acid, 2-amino-5-naphthol-7-sulfonic acid, 1-amino-8-naphthol-4,6-disulfonic acid and 1-amino-8-naphthol-4-sulfonic acid and —N=N—R$_2$ stands for the residue of a diazotized member selected from the group consisting of an aminobenzotriazole, a 3-amino-1,2,4-triazole, a 5-aminotetrazole, an aminoindazole, an amino-2-mercaptobenzoxazole and an amino-2-mercaptobenzothiazole.

6. The disazo dye compounds having the formula:

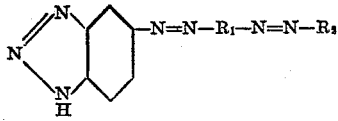

wherein R$_1$ represents the residue of a coupling component selected from the group consisting of 1-amino-8-naphthol-3,6-disulfonic acid, 2-amino-5-naphthol-7-sulfonic acid, 1-amino-8-naphthol-4,6-disulfonic acid and 1-amino-8-naphthol-4-sulfonic acid and —N=N—R$_2$ stands for the residue of a diazotized member selected from the group consisting of an aminobenzotriazole, a 3-amino-1,2,4-triazole, a 5-aminotetrazole, an aminoindazole, an amino-2-mercaptobenzoxazole and an amino-2-mercaptobenzothiazole.

7. The disazo dye compound which in its free acid form has the formula:

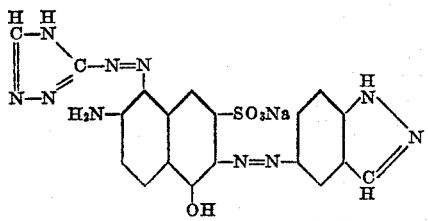

8. The disazo dye compound which in its free acid form has the formula:

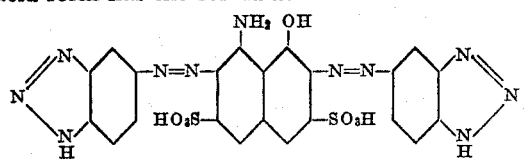

9. The disazo dye compound which in its free acid form has the formula:

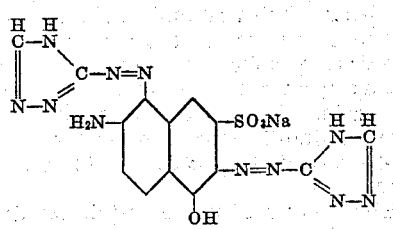

10. The process of preparing disazo dye compounds which comprises coupling in an acid medium a diazotized member selected from the group consisting of an aminobenzotriazole, a 3-amino-1,2,4-triazole and a 5-aminotetrazole with a coupling component selected from the group consisting of 1-amino-8-naphthol-3,6-disulfonic acid, 2-amino-5-naphthol-7-sulfonic acid, 1-amino-8-naphthol-4,6-disulfonic acid and 1-amino-8-naphthol-4-sulfonic acid and coupling the monoazo dye compound thus obtained with a diazotized aminoheterocyclic compound containing five members in the heterocyclic ring, at least one of which members is nitrogen, in an alkaline medium.

11. The process of preparing disazo dye compounds which comprises coupling in an acid medium a diazotized member selected from the group consisting of an aminobenzotriazole, a 3-amino-1,2,4-triazole and a 5-aminotetrazole with a coupling component selected from the group consisting of 1-amino-8-naphthol-3,6-disulfonic acid, 2-amino-5-naphthol-7-sulfonic acid, 1-amino-8-naphthol-4,6-disulfonic acid and 1-amino-8-naphthol-4-sulfonic acid and coupling the monoazo dye compound thus obtained with a diazotized member selected from the group consisting of an aminobenzotriazole, a 3-amino-1,2,4-triazole, a 5-aminotetrazole, an aminoindazole, an amino-2-mercaptobenzoxazole and an amino-2-mercaptobenzothiazole in an alkaline medium.

12. The process of preparing disazo dye compounds which comprises coupling in an acid medium a diazotized member selected from the group consisting of an aminobenzotriazole, a 3-amino-1,2,4-triazole and a 5-aminotetrazole with 1-amino-8-naphthol-3,6-disulfonic acid and coupling the monoazo dye compound thus obtained with a diazotized member selected from the group consisting of an aminobenzotriazole, a 3-amino-1,2,4-triazole, a 5-aminotetrazole, an aminoindazole, an amino-2-mercaptobenzoxazole and an amino-2-mercaptobenzothiazole in an alkaline medium.

13. The process of preparing disazo dye compounds which comprises coupling in an acid medium a diazotized member selected from the group consisting of an aminobenzotriazole, a 3-amino-1,2,4-triazole and a 5-aminotetrazole with 2-amino-5-naphthol-7-sulfonic acid and coupling the monoazo dye compound thus obtained with a diazotized member selected from the group consisting of an aminobenzotriazole, a 3-amino-1,2,4-triazole, a 5-aminotetrazole, an aminoindazole, an amino-2-mercaptobenzoxazole and an amino-2-mercaptobenzothiazole in an alkaline medium.

14. The process of preparing disazo dye compounds which comprises coupling in an acid medium diazotized 3-amino-1,2,4-triazole with a coupling component selected from the group consisting of 1-amino-8-naphthol-3,6-disulfonic acid, 2-amino-5-naphthol-7-sulfonic acid, 1-amino-8-naphthol-4,6-disulfonic acid and 1-amino-8-naphthol-4-sulfonic acid and coupling the monoazo dye compound thus obtained with a diazotized member selected from the group consisting of an aminobenzotriazole, a 3-amino-1,2,4-triazole, a 5-aminotetrazole, an aminoindazole, an amino-2-mercaptobenzoxazole and an amino-2-mercaptobenzothiazole in an alkaline medium.

15. The process of preparing disazo dye compounds which comprises coupling in an acid medium diazotized 5-aminobenzotriazole with a coupling component selected from the group consisting of 1-amino-8-naphthol-3,6-disulfonic acid, 2-amino-5-naphthol-7-sulfonic acid, 1-amino-8-naphthol-4,6-disulfonic acid and 1-amino-8-naphthol-4-sulfonic acid and coupling the monoazo dye compound thus obtained with a diazotized member selected from the group consisting of an aminobenzotriazole, a 3-amino-1,2,4-triazole, a 5-aminotetrazole, an aminoindazole, an amino-2-mercaptobenzoxazole and an amino-2-mercaptobenzothiazole in an alkaline medium.

CHARLES F. H. ALLEN.
GORDON F. FRAME.